United States Patent
Freiler

(10) Patent No.: US 6,994,101 B2
(45) Date of Patent: Feb. 7, 2006

(54) PRESSURE RELIEF VALVE

(75) Inventor: John L. Freiler, Somerset, NJ (US)

(73) Assignee: Girard Equipment, Inc., Linden, NJ (US)

( * ) Notice: Subject to any disclaimer, the term of this patent is extended or adjusted under 35 U.S.C. 154(b) by 301 days.

(21) Appl. No.: 10/706,479

(22) Filed: Nov. 4, 2003

(65) Prior Publication Data

US 2005/0092362 A1    May 5, 2005

(51) Int. Cl.
     *F16K 17/40*     (2006.01)

(52) U.S. Cl. .............. 137/74; 137/72; 137/79; 220/89.4

(58) Field of Classification Search .......... 220/89.4; 137/72, 74, 79
See application file for complete search history.

(56) References Cited

U.S. PATENT DOCUMENTS

| | | | |
|---|---|---|---|
| 4,139,005 A | | 2/1979 | Dickey |
| 5,762,091 A | * | 6/1998 | Sarne et al. .............. 137/74 |
| 6,145,530 A | | 11/2000 | Fernandez |

\* cited by examiner

*Primary Examiner*—Ramesh Krishnamurthy
(74) *Attorney, Agent, or Firm*—R. Gale Rhodes

(57) ABSTRACT

Pressure relief valve including an annular nut of relatively high thermal conductivity including a first end portion providing an inwardly extending axial cylindrical surface and an internal annular surface extending radially outwardly from the cylindrical surface and including an internally threaded second end portion, and a fusible disc including a cylindrical first end portion provided with frictional enhancement means in frictional engagement with the cylindrical surface to mount the fusible disc frictionally in the annular nut and including an annular second end portion engaging the annular surface to position the fusible disc in the annular nut.

19 Claims, 3 Drawing Sheets

PRESSURE RELIEF VALVE

BACKGROUND OF THE INVENTION

This invention relates to a pressure relief valve and more particularly relates to a pressure relief valve particularly useful for venting a container for containing fluid which expands and becomes increasingly pressurized upon external heat being applied to the container.

Such pressure relief valves are particularly useful in venting over-the-road tankers in accordance with ICC regulations.

Numerous of such pressure relief valves are known to the art. For example, a pressure relief valve entitled SAFETY RELEASE PIPE CAP is disclosed in U.S. Pat. No. 4,139,005, patented Feb. 13, 1979, Gilbert C. Dickey, Inventor. One embodiment of the pressure relief valve disclosed in this patent includes a polypropylene ferrule of relatively low thermal conductivity and a fusible disc of mixed polymeric material typically consisting of an 80–20% by weight mixture of low density polyethylene and ethylvinylacetate. Such fusible disc is taught as melting at a predetermined temperature, 220° F.–250° F., to vent a container containing fluid expanding due to external heat being applied to the container. The heat from the container is conveyed to the fusible disc by direct engagement between the fusible disc and a vent pipe connected to the container. Since the ferrule is of a relatively low thermal conductivity material, the ferrule does not transfer, or at least does not substantially assist in transferring, heat from the container to the fusible disc.

Some pressure relief valves known to the art have a depressed or inwardly extending top which can form a cavity which tends to accumulate foreign matter such as dirt and other debris and, in winter, ice and snow. Such foreign matter can obscure the top of the pressure relief valve and if sufficiently severe can potentially, at least, inhibit the pressure relief function of the pressure relief valve.

It is believed there is need in the art for a new and improved pressure relief valve including an element of relatively high thermal conductivity in which a fusible member is mounted and which element of relatively high thermal conductivity enhances the conduction of heat to the fusible member. It is believed there is a further need in the art for a new and improved pressure relief valve having a smooth, or at least substantially smooth, top which inhibits the accumulation of foreign matter thereon such as the afore-noted dirt and other debris, and ice and snow occurring in winter.

SUMMARY OF THE INVENTION

Pressure relief valve including an annular nut of relatively high thermal conductivity including a first end portion providing an inwardly extending axial cylindrical surface and an internal annular surface extending radially outwardly from the cylindrical surface and including an internally threaded second end portion, and a fusible disc including a cylindrical first end portion provided with frictional enhancement means in frictional engagement with the cylindrical surface to mount the fusible disc frictionally in the annular nut and including an annular second end portion engaging the annular surface to position the fusible disc in the annular nut.

DESCRIPTION OF THE PREFERRED EMBODIMENT

Figure 1:
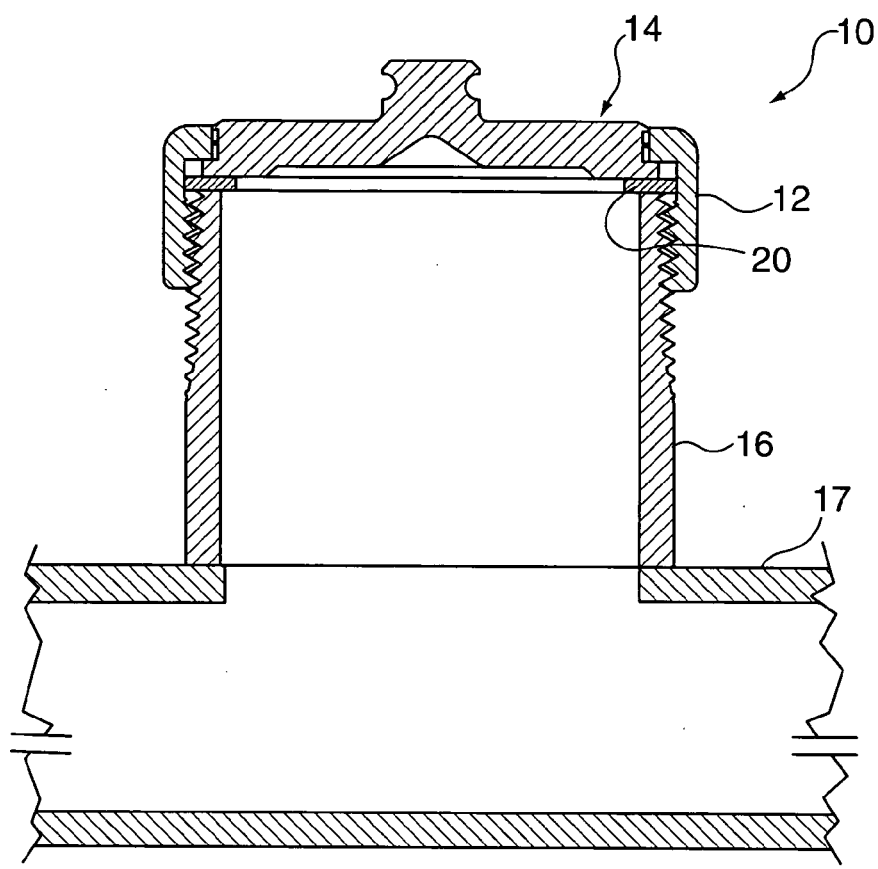
FIG. 1 shows a pressure relief valve in cross-section embodying the present invention and shown mounted to a container for containing fluid.

Referring to FIG. 1, a pressure valve embodying the present invention is shown in cross-section and indicated by general numerical designation 10. Pressure valve 10 may include a hollow or annular cylindrical nut indicated by general numerical designation 12 of relatively high thermal conductive material and a fusible disc, or fusible cap disc, indicated by general numerical designation 14. The nut 12 is shown in threaded engagement, and thereby in thermal and mechanical engagement, with a pipe or nipple 16 extending outwardly from a container 17 for containing fluid. Typically, the pipe 16 and container 17 are made of relatively high thermal conductivity material and it will be understood that upon the fluid contained in the container 17 expanding and becoming increasingly pressurized due to external heat applied to the container 17, the heat from the container 17 is transferred directly to the nut 12 by the pipe 16 and such heat is transferred directly to the fusible disc 14 by the nut 12 of high thermal conductivity causing the fusible disc 14 to melt and vent the container 17 prior to the fluid contained in the container expanding and becoming sufficiently pressurized as to cause the container to explode. Since the annular nut 12 of the present invention is of high thermal conductivity, the transfer of heat from the container 17 and the pipe 16 is enhanced thereby enhancing the melting and venting function of the fusible disc 14. The pressure valve 10 may further include an annular gasket 20 for facilitating sealing engagement between container pipe 16 and the pressure valve 10. The nut 12 and fusible disc 14 are shown assembled and in top perspective view in FIG. 2 and a separate top perspective view of the nut 12 is shown in FIG. 3 and in cross-section in FIG. 4.

Figure 3:
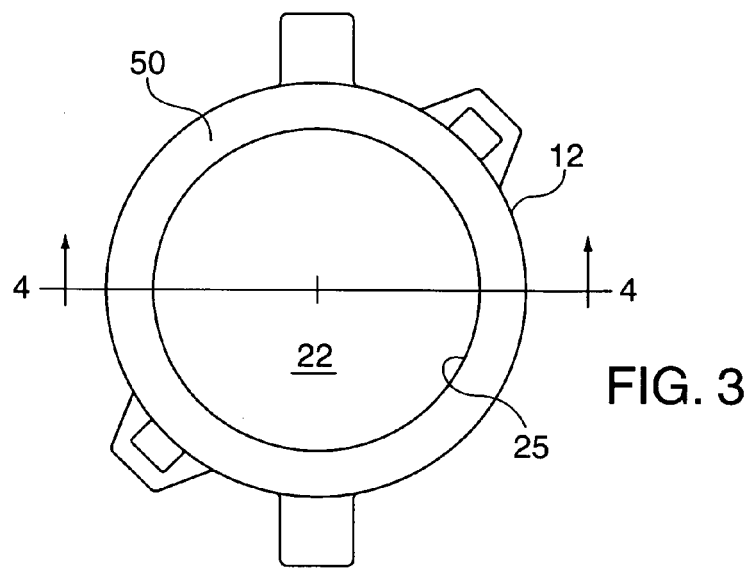
FIG. 3 is a top view of a hollow element or nut of relatively high thermal conductivity comprising the present invention.
Figure 4:
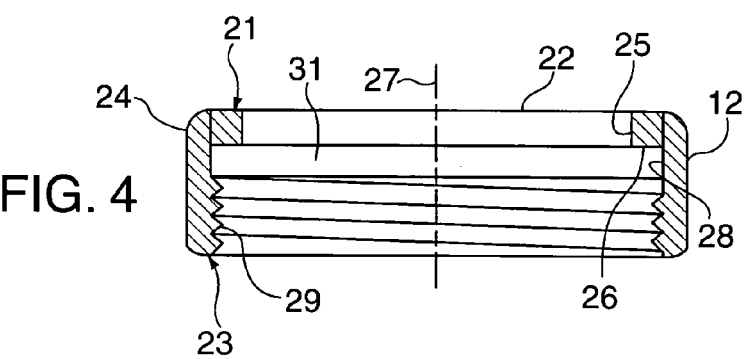
FIG. 4 is a horizontal cross-sectional view taken generally along the line 4—4 in FIG. 3 and in the direction of the arrows.

The annular cylindrical nut 12, FIGS. 3 and 4, and particularly FIG. 4, includes an open first end portion indicated by general numerical designation 21 providing a central circular opening 22 and an open second end portion indicted by general numerical designation 23. The first end portion 21 may be comprised of an inwardly extending annular flange portion 24 as shown in FIG. 4 which flange portion provides an axial cylindrical friction engaging surface 25 and an annular radial engaging or stop surface 26; the axial cylindrical friction engaging surface 25 defining the circular central opening 22. The nut 12, FIG. 4, has a central axis 27 and it will understood that the axial cylindrical friction engaging surface 25 extends axially inwardly of the nut 12 and that the annular radial engaging or stop surface 26 is disposed axially inwardly of the surface 25 and extends radially outwardly therefrom at substantially a right angle. The first end portion 21 of the hollow cylindrical nut 12, FIG. 4, is further provided with an internal, radially outwardly extending annular surface 28 disposed axially inwardly of the annular radial engaging or stop surface 26 and generally perpendicular thereto. The second end portion 23 of the nut 12 is provided with a plurality of internal threads 29. As will be understood from FIG. 1, the container pipe or nipple 16 is provided with a plurality of external threads 30 which are threadedly engaged by the nut internal threads 29 to place the pressure valve 10 in mechanical and thermal engagement or contact with the container 17. It will be noted from FIG. 4 that the annular surface 28 extends radially outwardly of the cylindrical surface 25 and the internal threads 29 and provides an annular area 31 whose function is described in detail below.

Figure 5:
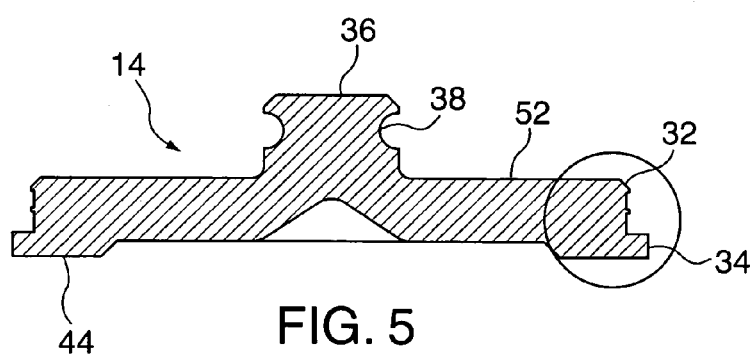
FIG. 5 is a separate cross-sectional view of a fusible disc comprising the present invention.
Figure 6:
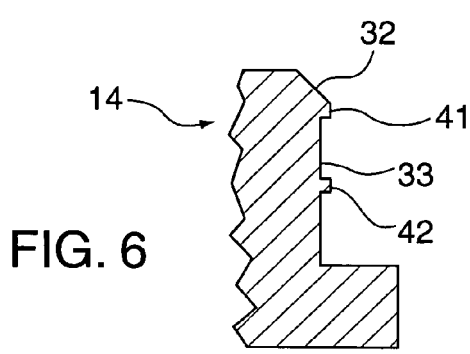
FIG. 6 is an enlarged view of the encircled portion of FIG. 5.

Referring to FIGS. 5 and 6, the fusible disc, or fusible cap disc 14 includes a first end portion 32 and a second end portion 34. The first end portion 32, as shown in FIG. 5, is a cylindrical first end portion and the second end portion 34 is an annular second end or flange portion extending radially outwardly from the lower portion of the first end portion 32. The fusible cap disc 14 may be provided with a centrally upwardly extending knob or knob portion 36 provided with an intermediate annular groove or indentation 38 for receiving a clip (not shown), to which clip a chain may be attached to mount or attach the pressure relief valve 10 to the container 17 in a manner known to the art.

As shown in enlarged detail in FIG. 6, the outer cylinder surface 33 of the first cylindrical end portion 32 of the fusible disc 14 may be provided with friction enhancement means for enhancing the frictional engagement between the first cylindrical end portion 32 of the fusible disc 14 with the cylindrical friction engaging surface 25 (FIG. 4) of the hollow nut 12. Such friction enhancement means may comprise one or more outwardly extending annular ridges with two such axially spaced apart and radially outwardly annular ridges 41 and 42 being shown in FIG. 6 by way of example with regard to the preferred embodiment shown.

Referring again to FIGS. 5 and 6, the underside of the second end portion 34 of the fusible disc 14 provides an annular gasket seating surface 44 which serves as a seat for the annular gasket 20 as shown in FIG. 1.

Figure 2:
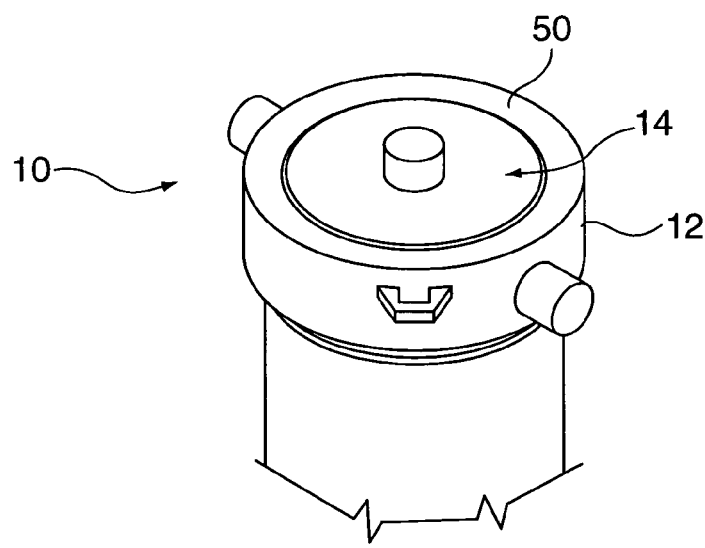
FIG. 2 is a top perspective view of the pressure relief valve of the present invention.
Figure 7:
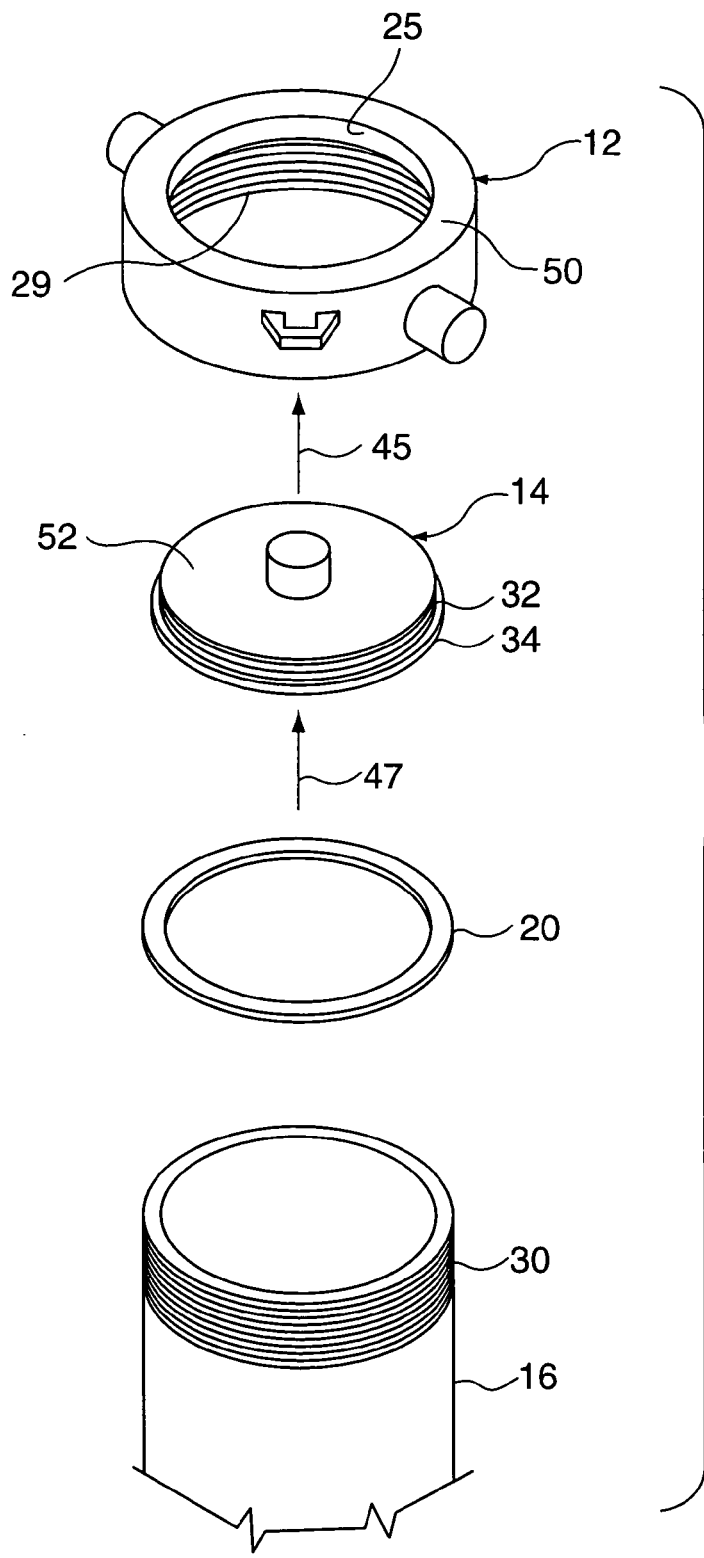
FIG. 7 is an exploded assembly view, in perspective, of elements which may comprise the pressure relief valve of the present invention.

In assembly, and referring to FIG. 7, the fusible disc, or fusible cap disc 14, is inserted upwardly into the bottom or open second end portion 23 (FIG. 4) of the hollow cylindrical nut 12, as indicated by the arrow 45, and the cylindrical end upper portion 32, and the annular ridges 41 and 42 (FIG. 6), of the fusible disc 14 are forced into frictional engagement with the cylindrical friction engaging surface 25 of the nut 12 to mount the fusible disc 14 frictionally in and to the nut 12 as shown in FIGS. 1 and 2 with the cylindrical upper end portion 32 of the fusible disc 14 residing in the circular central opening 22 of the annular nut 12. The annular engaging or stop surface 26, FIG. 4, of the nut 12 provides a stop for positioning the fusible disc 14 in the hollow nut 12 and for preventing the fusible disc 14 from being forced outwardly of the nut 12 as the fusible disc is forced into the nut for frictional mounting. As will be noted from FIG. 1, the radially outwardly extending annular second end portion 34 of the fusible disc 14 resides in the annular hollow nut area 31 (FIG. 4). Referring further to FIG. 7, the annular gasket 20 of suitable deformable material, is then inserted into the second open end portion 23 (FIG. 4) of the hollow nut 12, as indicated by the arrow 47 in FIG. 7, is deformed sufficiently to be forced past the internal threads 29 of the hollow nut 12, and is further forced into the hollow nut annular area 31 (FIG. 4) and into engagement with the annular gasket seating surface 44 (FIG. 5) provided by the lower flange portion 34 of the fusible disc 14; as shown in FIG. 1, the outer peripheral portion of the gasket resides in the annular area 31 (FIG. 4) and the gasket is mounted to the nut 12 and fusible disc 14. Thereafter, and as noted above, the pressure valve 10 of the present invention may be mechanically and thermally mounted or connected to the container 17, FIG. 1, as described above and upon threaded engagement between the internal threads 29 of the nut 12 (FIG. 4) and the external threads 30 of the container pipe or nipple 16, the annular upper end surface of the pipe or nipple 16 will be forced into engagement with the annular gasket 20 as shown in FIG. 1 to compress the gasket between the annular end of the pipe or nipple 16 and annular gasket sealing surface 44 (FIG. 5) of the fusible member 14 to provide a sealed engagement between the pressure valve 10 and the container 17 and to place the fusible member 14 in fluid communication with the interior of the container 17.

Referring further to FIGS. 2–5 and 7, it will be understood that the inwardly extending flange portion 24 of the hollow cylindrical nut 12 provides an annular top surface 50 and that the cylindrical first end portion 32 of the fusible cap disc 14 provides a circular top surface 52. As will be understood particularly from FIG. 2, upon assembly of the hollow cylindrical nut 12 and the fusible cap disc 14, the annular top surface 50 of the hollow nut 12 and the circular top surface 52 of the fusible cap disc 14 combine to provide a smooth, or at least substantially smooth, top surface which inhibits the collection of foreign matter thereon such as the above-noted dirt, other debris, and, in winter, snow and ice.

The nut 12 of relatively high thermal conductive material may be made, for example, of stainless steel and may be suitably machined into the shape shown and described above. The fusible disc 14 may be made, for example, of high density polyethylene, foamed, may have a melting temperature of about 280°F. and may be suitably shaped as shown by suitable molding.

The pressure valve of the present invention is useful as a pressure valve for venting over-the-road tankers in accordance with ICC regulations and is also useful for venting stationary storage containers.

It will be understood that many variations and modifications may be made in the present invention without departing from the spirit and scope thereof.

What is claimed is:

1. Pressure relief valve for venting a container of thermally conductive material which is for containing a fluid which expands and becomes pressurized upon the container being heated, comprising:
   a hollow member of relatively high thermal conductivity including a first end portion and a second end portion, said first end portion provided with a first internal surface and a second internal surface disposed inwardly of and extending outwardly from said first internal surface;
   a fusible member including a first end portion and a second end portion provided with an outwardly extending portion, said first end portion provided with friction enhancement means, said fusible member for being inserted into said hollow member through said second end portion thereof and said first end portion and said friction enhancement means of said fusible member for being forced into frictional engagement with said first internal surface of said hollow member to frictionally mount said fusible member in said hollow member, as said first end portion of said fusible member is being forced into frictional engagement with said first internal surface of said hollow member said outwardly extending portion of said second end portion of said fusible member for engaging said second internal surface of said hollow member to position said fusible member in said hollow member and to prevent said fusible member from being forced outwardly of said hollow member through said first end portion thereof as said fusible member is mounted frictionally to said hollow member; and said second end portion of said hollow member for being placed in mechanical and thermal engagement with the container.

2. The pressure valve according to claim 1 wherein said friction enhancement means comprise at least one ridge extending outwardly from said first end portion of said fusible member.

3. The pressure valve according to claim 1 wherein said friction enhancement means comprise a plurality of ridges spaced apart and extending outwardly from said first end portion of said fusible member.

4. The pressure valve according to claim 1 wherein said hollow member is a hollow cylindrical member, wherein said first end portion is a radially inwardly extending annular portion providing said first surface and said second surface, wherein said first surface is an axially extending internal cylindrical surface having an inner end and wherein said second surface is an annular surface extending radially outwardly from said inner end of said cylindrical surface and disposed at a right angle with respect thereto.

5. The pressure valve according to claim 1 wherein said fusible member is a fusible disc member, wherein such first end portion of said fusible disc member is a cylindrical first end portion and wherein said second end portion of said fusible disc member comprises an annular flange portion extending radially outwardly from said cylindrical first end portion of said fusible disc member.

6. The pressure valve according to claim 5 wherein said friction enhancement means comprise at least one annular ridge extending radially outwardly from said cylindrical first end portion of said fusible disc member.

7. The pressure valve according to claim 5 wherein said friction enhancement means comprise a plurality of annular ridges spaced apart axially and extending radially outwardly from said cylindrical first end portion of said fusible disc member.

8. The pressure valve according to claim 4 wherein said second end portion of said hollow cylindrical member is provided with internal threads, wherein said container is provided with an outwardly extending pipe provided with external threads and wherein said internal threads are for threadedly engaging said external threads to place said hollow cylindrical member in mechanical and thermal engagement with said container.

9. The pressure valve according to claim 8 wherein said pipe includes an outer annular end, wherein annular said annular flange portion of said fusible disc member provides an annular gasket sealing surface, and wherein said pressure valve further includes an annular gasket for being positioned intermediate said outer annular end of said pipe and said annular gasket sealing surface.

10. A pressure relief valve for venting a container, comprising:

a hollow generally annular nut of relatively high thermal conductivity having opposed open ends and including a first end portion providing a cylindrical friction engaging surface and an annular stop surface disposed axially inwardly from, and extending radially outwardly from, said cylindrical friction engaging surface;

a fusible disc including a cylindrical first end portion providing a cylindrical surface provided with friction enhancement means and a second end portion providing an annular flange extending radially outwardly from said cylindrical first end portion and displaced axially therefrom;

said cylindrical first end portion of said fusible disc and said friction enhancement means for being forced into frictional engagement with said cylindrical friction engaging surface of said hollow nut to mount said fusible disc to said hollow nut and said annular flange of said fusible disc engaging said annular stop surface of said hollow nut to position said fusible disc in said hollow nut and prevent said fusible disc from being forced out of said hollow nut as said fusible disc is mounted frictionally in said hollow nut; and said annular nut including an internally threaded second end portion for threadedly engaging the external threads provided on a pipe extending out of the container to place the pressure relief valve in mechanical and thermal engagement with the container.

11. The pressure relief valve according to claim 10 wherein said friction enhancement means comprise at least one annular ridge extending radially outwardly from said cylindrical surface of said cylindrical first end portion of said fusible disc.

12. The pressure relief valve according to claim 10 wherein said friction enhancement means comprise a plurality of axially spaced apart and radially outwardly extending annular ridges provided on said cylindrical surface of said cylindrical first end portion of said fusible disc.

13. The pressure relief valve according to claim 10 wherein said fusible disc is a fusible cap disc, wherein said first end portion of said annular nut is a radially inwardly extending flange portion providing an annular top surface, and wherein said fusible cap disc includes a circular top surface residing on top of said cylindrical first end portion of said fusible cap disc and wherein said annular surface and said circular surface combine to provide said pressure relief valve with a substantially smooth top surface.

14. Pressure relief valve, comprising:

an annular nut of relatively high thermal conductivity having a central axis, said nut including a first end portion and a second end portion, said first end portion provided with an inwardly extending axial cylindrical surface and an internal annular surface displaced axially inwardly of and extending radially outwardly from said cylindrical surface, said second end portion provided with internal threads;

a fusible disc having a cylindrical first end portion including a cylindrical surface provided with at least one outwardly extending annular ridge and an annular second end portion extending radially outwardly from said cylindrical first end portion;

said cylindrical first end portion of said fusible disc forced into frictional engagement with said cylindrical surface of said annular nut and said annular second end portion of said fusible disc engaging said annular surface of said annular nut to position said fusible disc in said annular nut and to prevent said fusible disc from being forced outwardly of said annular nut as said cylindrical first end portion of said fusible disc is forced into frictional engagement with said cylindrical surface of said annular nut.

15. The pressure relief valve according to claim 14 wherein said annular second end portion of said fusible disc provides an outer annular gasket sealing surface, and wherein said pressure relief valve further comprises an annular gasket positioned internally of said annular nut and engaging said annular gasket sealing surface and residing intermediate said annular gasket sealing surface and said internal threads.

16. The pressure relief valve according to claim 14 wherein said cylindrical surface provided on said fusible disc provides a plurality of axially spaced apart and radially outwardly extending annular ridges.

17. The pressure relief valve according to claim 14 wherein said fusible disc is a fusible cap disc, wherein said annular nut provides an annular top surface, and wherein said fusible cap disc provides a circular top surface residing on top of said cylindrical first end portion of said fusible cap disc and wherein said annular surface and said circular surface combine to provide said pressure relief valve with a substantially smooth top surface.

18. Pressure relief valve including an annular nut of relatively high thermal conductivity including a first end portion providing an inwardly extending axial cylindrical surface and an internal annular surface extending radially outwardly from said cylindrical surface and including an internally threaded second end portion, and a fusible disc including a cylindrical first end portion provided with frictional enhancement means in frictional engagement with said cylindrical surface to mount said fusible disc frictionally in said annular nut and including an annular second end portion engaging said annular surface to position said fusible disc in said annular nut.

19. A pressure relief valve for venting a container having an interior and provided with a pipe extending outwardly therefrom, the pipe being in fluid communication with the interior of the container, having an annular end and being provided with external threads, having an annular end, comprising:

a hollow generally annular nut of relatively high thermal conductivity including an open first end portion and an opposed open second end portion, said open first end portion including a radially inwardly extending flange portion providing a central circular opening defined by an inwardly extending axial cylindrical friction engaging surface and said open first end portion further providing an annular stop surface disposed axially inwardly from, and extending radially outwardly from, said cylindrical friction engaging surface, said open second end portion provided with a plurality of internal threads, and said flange portion further providing an annular surface disposed intermediate and extending radially outwardly from said cylindrical friction engaging surface and said internal threads and providing an annular area;

a fusible cap disc including a cylindrical first end portion provided with at least one outwardly extending annular ridge and further including an annular flange second end portion extending radially outwardly from said cylindrical first end portion and including an outer surface providing an annular gasket sealing surface;

an annular gasket including an outer annular peripheral portion;

said cylindrical first end portion of fusible cap disc residing in said circular opening with said annular ridge frictionally engaging said cylindrical friction engaging surface to mount said fusible cap disc to and in said annular nut and said annular flange of said fusible cap disc residing in said annular area, and said annular second flange end portion of said fusible disc engaging said annular stop surface to prevent said fusible cap disc from being forced out of said annular hollow nut as said fusible cap disc is mounted frictionally in said circular opening of said hollow nut, and the outer annular peripheral portion of said gasket residing in said annular area; and said internal threads for threadedly engaging said external threads to compress said annular gasket between said annular end of said pipes and said annular gasket sealing surface of said fusible cap disc to seal said pressure relief valve to the container, to place said annular nut in mechanical and thermal engagement with the container and to place said fusible cap disc in fluid communication with the interior of the container.

* * * * *